June 29, 1965 W. N. CARROLL 3,192,484

FREQUENCY FLIP-FLOP

Original Filed Dec. 26, 1957 4 Sheets-Sheet 1

INVENTOR
WILLIAM N. CARROLL

BY Joseph J. Connerton

ATTORNEY

June 29, 1965 W. N. CARROLL 3,192,484

FREQUENCY FLIP-FLOP

Original Filed Dec. 26, 1957 4 Sheets-Sheet 2

June 29, 1965 W. N. CARROLL 3,192,484

FREQUENCY FLIP-FLOP

Original Filed Dec. 26, 1957 4 Sheets-Sheet 3

United States Patent Office 3,192,484 Patented June 29, 1965

3,192,484
FREQUENCY FLIP-FLOP

William N. Carroll, Rhinebeck, N.Y., assignor to International Business Machines Corporation, New York, N.Y., a corporation of New York Continuation of application Ser. No. 705,290, Dec. 26, 1957. This application Aug. 17, 1959, Ser. No. 835,382
5 Claims. (Cl. 331—39)

The present invention relates to a circuit utilizing semiconductive devices and more particularly to a bistable circuit wherein the stable states of the device are identified by the frequency of the output signals. This is a continuation of my abandoned application, Serial No. 705,290, filed December 26, 1957.

In circuits utilized with high speed computers, it is frequently desirable to combine or compare the effects of two or more separate signals in such a way that the identifiable characteristics of the resultant signal identify the relationship of the several signals. In the description of the invention herein given by way of disclosure, the principles of the invention are illustrated in a switching circuit or flip-flop having two stable states and adapted to switch from one state to the other upon application of a signal or signals of selected characteristics.

Circuits of this general class usually operate on D.C. level or pulse inputs and the resultant of the logical function being provided is generally identified by the level of the output or outputs. Such circuits frequently utilize vacuum tubes or transistors to provide the desired logical operation. However, the inherent disadvantages of vacuum tubes such as relatively high operating voltage, characteristic fragility and short life, together with the poor signal to noise tolerance associated with such circuits imposes undesirable limiting conditions upon the nature and levels of the signals applied thereto. While transistor circuits represented an improvement in certain of these limiting conditions, particularly low signal level, they retained the poor signal to noise characteristic and in addition were subject to many undesirable transient heating effects inherent in current on-off transistor circuits.

To overcome such limitations of the prior art, the subject invention provides a new approach to logical design. Such logic, hereinafter defined as frequency logic, basically employs frequency rather than D.C. level to define a particular logical condition. While the principle of frequency logic is considered applicable to a variety of logical elements, the specific embodiment employed to illustrate the subject invention is a switching circuit or flip-flop wherein bistable circuit operation is controlled by selective application of two frequency signals to the input, and the state of the device is indicated by the frequency of the output signals. One embodiment of the invention is a two frequency switching circuit wherein selection between states is afforded by the selective application of signals having the same frequencies as those of the output signals used to indicate the logical state of the device. In an alternate arrangement, four frequencies are utilized, two signals to provide selection between states and four output signals to indicate the logical state of the device, two of the output signals having the same frequency as the input signals. Both embodiments utilize a local signal source, mixer circuits and selective filtering devices to provide the logical function, and a feedback arrangement from one output to the input of the circuit to maintain the device in its stable state. Due to operation at a relatively constant energy level, the above described limitations of prior art logical devices are avoided and improved voltage tolerance, improved signal tolerance, minimum transient heating effects and increased reliability are provided.

Accordingly, a primary object of the present invention is to provide an improved switching circuit.

Another object of the present invention is to provide a logical element adapted for use in a frequency logic system wherein logical conditions are specified by the frequency of the resultant signals.

Still another object of the present invention is to provide a transistor switching circuit wherein the binary states of the circuit are identified by the frequency of the output signals.

A further object of the present invention is to provide a frequency flip-flop having two stable states wherein the state to which said flip-flop is set or maintained is selectively controlled by the frequency of the input signal.

Another object of the present invention is to provide an improved logical device wherein the logical condition to be provided determines the frequency of the input signal and the logical resultant is designated by the frequency of the output signals.

Still another object of the present invention is to provide a logical device utilizing the heterodyne principle.

Other objects of the invention will be pointed out in the following description and claims and illustrated in the accompanying drawings, which disclose, by way of example, the principle of the invention and the best mode, which has been contemplated, of applying that principle.

Throughout the following description and in the accompanying drawings there are certain conventions employed which are familiar to certain of those skilled in the art. In the logical or block diagrams of the drawings, a conventional arrowhead indicates a circuit connection and the direction of signal travel which is also the direction of control. In the description the general arrangement of several preferred embodimenas of this invention will be described with respect to the manner in which the various circuit components and apparatus are interconnected as well as the general over-all operation which is performed by those components and apparatus. The description of the general arrangement will be followed by separate and detailed descriptions of a preferred embodiment of the invention and the various components and apparatus which so require it.

Figure 1:
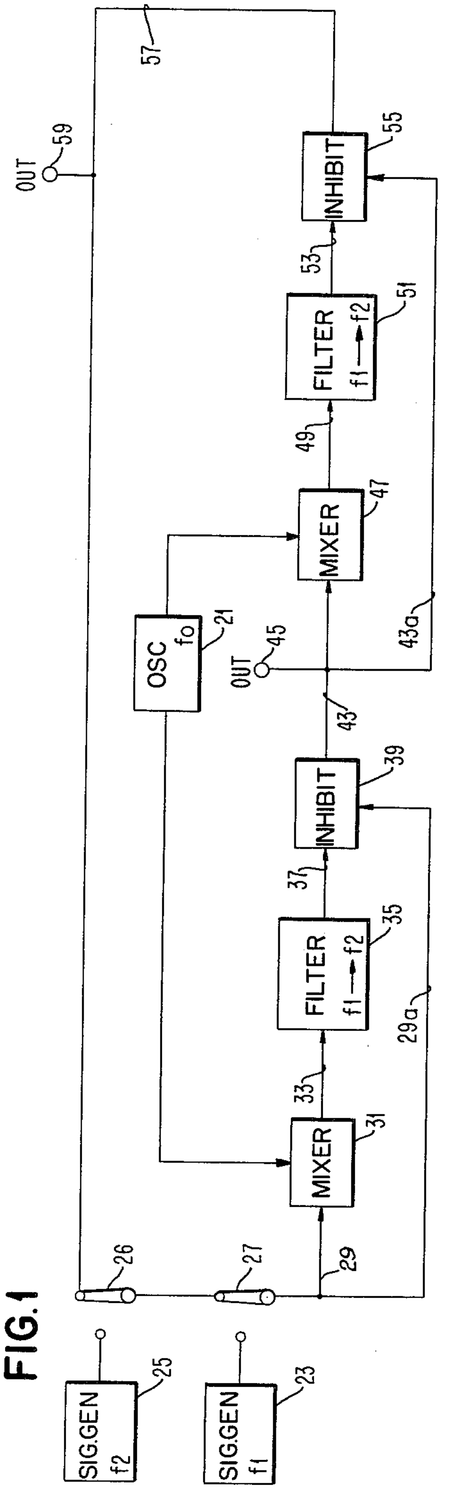
FIG. 1 illustrates in simplified block form a first embodiment of the subject invention.

Referring now to the drawings and more particularly to FIG. 1 thereof, there is illustrated in block form an embodiment of the subject invention utilizing a dual frequency input, the individual signals being hereinafter designated as $f_1$ and $f_2$, and a local signal source having a frequency hereinafter designated $f_0$, wherein the frequency of $f_2$ is equal to that of $f_1+f_0$ and wherein $f_1>f_0$. Signal sources $f_0$, $f_1$, and $f_2$ are shown in FIG. 1 as blocks 21, 23, and 25 respectively, wherein signal $f_0$ is provided by a local oscillator. While individual signal sources are shown for signals $f_1$ and $f_2$ in the preferred embodiment, such signals would be available in a frequency logic system herein contemplated, and separate signal sources would not be required for each logical element. In the ensuing description, signals $f_1$ and $f_2$ will be designated as the binary "1" and the binary "0" inputs to the illustrated embodiment, hereinater designated as a frequency flip-flop.

To set the flip-flop in the "1" state, signal $f_1$ is applied momentarily through switch 27 and conductor 29 to mixer circuit 31, the second input to which is signal $f_0$. After the signal $f_1$ has been applied, the switch 27 is returned to the position as shown in FIG. 1. Mixer circuit 31 operates as a conventional mixer to produce four signals on output conductor 33, the component signals $f_1$ and $f_0$, the sum and difference signals $f_1+f_0$ or $f_2$ and $f_1-f_0$ respectively. These signals are then applied to filter 35, a band-pass filter designed to pass a frequency range between and including $f_1$ and $f_2$. The resultant signals $f_1$ and $f_2$ are then applied through conductor 37 to inhibit circuit 39. Inhibit circuit 39, as more fully described hereinafter, is a circuit which cancels any signal which appears simultaneously on input conductor 37 and 29a, while passing any other signal applied to input conductor 37. As shown in FIG. 1, the signal applied through conductor 29 to mixer circuit 31, in the present example $f_1$, is also applied through conductor 29a to inhibit circuit 39. Since signal $f_1$ appears on both input conductors, it is cancelled and the resultant output signal on conductor 43, $f_2$ designates one of the binary outputs of the frequency flip-flop. Thus the signal $f_1$ applied to mixer 31 results in signal $f_2$ being applied to output terminal 45.

Signal $f_2$ on conductor 43 is also applied to mixer circuit 47, where it is mixed with the signal $f_0$ from oscillator 21. The resultant four output signals on conductor 49 are $f_0$, $f_2$, $f_2-f_0$ or $f_1$ and $f_2+f_0$. Band pass filter 51, which is substantially identical to band pass filter 35, passes signal $f_2$ and $f_1$ through conductor 53 to inhibit circuit 55 which is identical with inhibit circuit 39.

It will be noted from the drawing that the input signal to mixer circuit 47 in the instant example, $f_2$, is also applied through conductor 43a to inhibit circuit 55. The $f_2$ signal is cancelled, and the remaining signal $f_1$ is applied through conductor 57 to the second output terminal 59, which designates the other binary output from the flip-flop. The $f_1$ signal is also applied through conductor 57 and switches 26 and 27 as a feedback signal to the input of mixer 31 to thereby maintain the frequency flip-flop in its stable state.

From the above description it will be recognized the signal $f_1$, which is initially applied through switch 27 to mixer 31, is applied as a feedback signal from inhibit circuit 55 upon closing switch 27. Thus the flip-flop is set and maintained in the "1" state by signal $f_1$, and is identified by signals $f_2$ and $f_1$ on output terminals 45 and 59 respectively.

To reset the frequency flip-flop to the "0" state, switch 26 is operated, thereby simultaneously removing the feedback $f_1$ signal to mixer circuit 31 and substituting the $f_2$ signal. When mixed with the $f_0$ frequency from oscillator 21, the resultant output signals from mixer 31 on conductor 33, $f_0$, $f_2$, $f_2-f_0$ or $f_1$ and $f_2+f_0$ are filtered by band-pass filter 35 whereby the resultant signals $f_1$ and $f_2$ are applied through conductor 37 to inhibit circuit 39. However, since $f_2$ is also applied through conductor 29a to inhibit circuit 39, it is cancelled within the inhibit circuit and the ersulting signal $f_1$ is applied through conductor 43 to output terminal 45. Thus signal $f_2$ applied to the mixer circuit 31 causes signal $f_1$ to appear on terminal 45. Signal $f_1$ is also applied through conductor 43 to mixer circuit 47 where it is mixed with $f_0$, to provide the four output signals $f_1$, $f_0$, $f_1+f_0$ or $f_2$ and $f_1-f_0$. After filtering by band pass filter 51, signals $f_1$ and $f_2$ are applied through conductor 53 to inhibit circuit 55, where the $f_1$ signal applied as the second input to inhibit circuit 55 through conductor 43a is cancelled. The resulting signal $f_2$ is then applied through conductor 57 to output terminal 59 and reapplied as a feedback signal through switches 26 and 27 to mixer 31 to maintain the circuit in its second stable state. Thus the "0" state of the frequency flip-flop is identified by signals $f_1$ and $f_2$ on output terminals 45 and 59 respectively.

From the above description it will be recognized that for an input signal $f_1$, output signals of $f_2$ and $f_1$ are provided on output terminals 45 and 59; for an input signal $f_2$, output signals $f_1$ and $f_2$ are provided on output terminals 45 and 59 respectively. Since the frequency of $f_2$ is equal to $f_1+f_0$, in a logical system as contemplated in the subject invention, signal source $f_2$ might be provided from another logical device or common signal frequency source rather than requiring a separate signal source. A single frequency signal source could be utilized in the above described embodiment by selectively applying it to the mixer circuits in accordance with the logical function to be provided. Applying signal $f_1$ to mixer 47, for example, would provide the same result as applying signal $f_2$ to mixer 31, and vice versa. Using a single input signal source, the state to which the binary flip-flop would be set would be controlled by the particular input and mixer to which the single frequency would be applied. Switches 26 and 27 might be any conventional electronic switch or selection matrix which would be operated long enough to initiate transition and then returned to its normally closed position.

Figure 2:
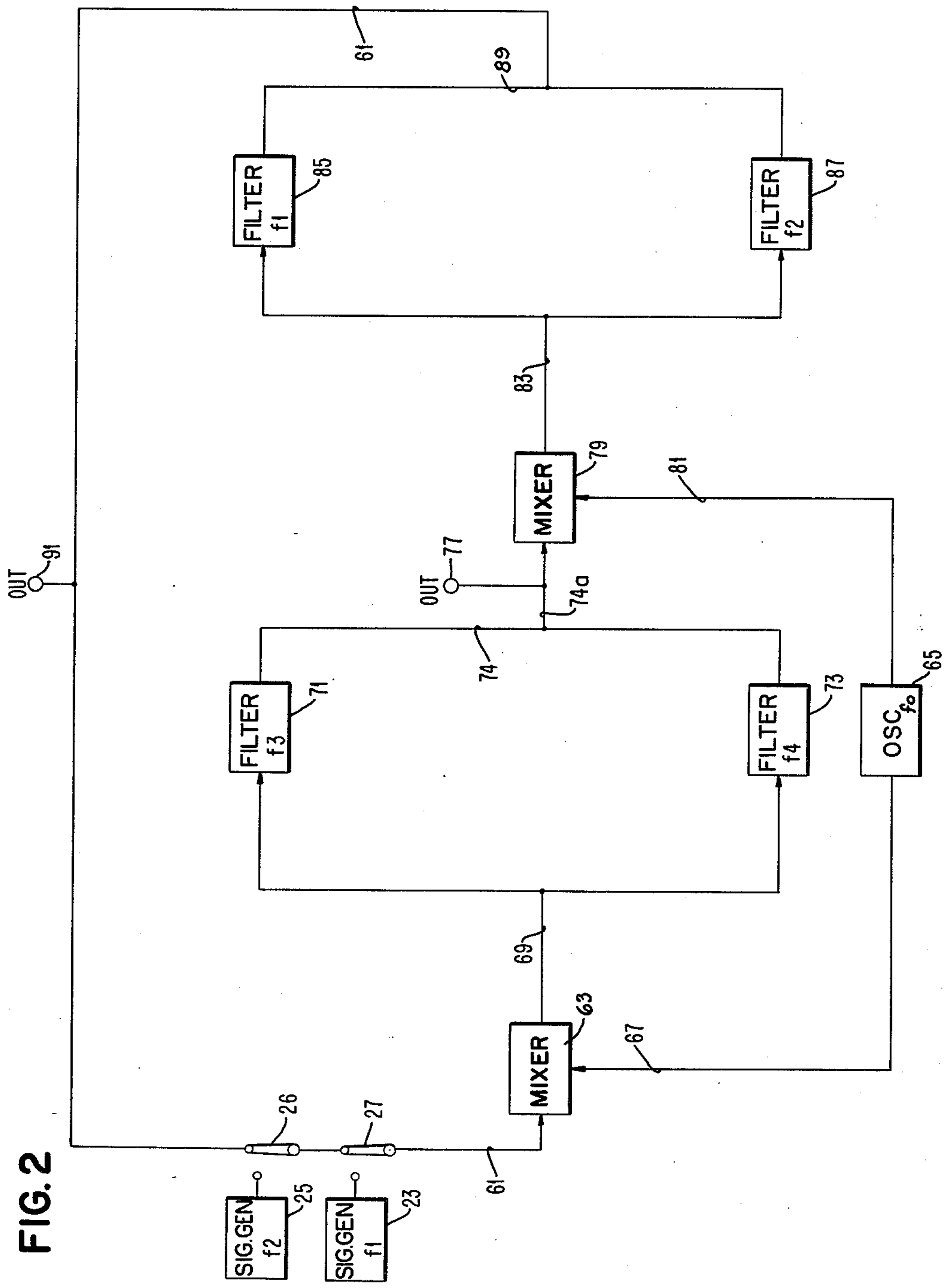
FIG. 2 illustrates in simplified block form a second embodiment of the subject invention.

While the input and output signals of the above described embodiment utilize the same pair of frequencies, another embodiment of the subject invention shown in FIG. 2 utilizes a dual frequency input to obtain dual output signals of different frequencies, or a total of four different frequency signals, thereby eliminating the necessity of an inhibiting circuit. In the ensuing description, the input frequencies are designated as $f_1$ and $f_2$, while the corresponding output signals are designated as $f_1$, $f_2$, $f_3$, $f_4$ and the local oscillator is designated $f_0$, wherein $f_0>f_1$ and $f_2$, $f_3=f_0-f_1$ and $f_4=f_0-f_2$. Signals $f_1$ and $f_2$ will be assumed to "set" and "reset" the flip-flop respectively.

To set the flip-flop to the "1" state, signal $f_1$ is applied from signal generator 23 through switch 27 and conductor 61 to mixer 63, where it is mixed with the $f_0$ signal applied from oscillator 65 through conductor 67 to generate four output signals on conductor 69, $f_0$, $f_1$, $f_0+f_1$ and $f_0-f_1$ or $f_3$. These signals on conductor 69 are applied to filter networks 71 and 73, which are designed to pass signals of $f_3$ and $f_4$ frequencies respectively. Since signal $f_3$ is included in the outputs from mixer 63, it is applied through filter 71 and conductors 74 and to output terminal 77 as well as to the input of mixer circuit 79, where it is mixed with the $f_0$ signal on conductor 81 to generate a second series of output signals on conductor 83, $f_0$, $f_3$, $f_0-f_3$ or $f_1$ and $f_0+f_3$. These signals are in turn applied to filter networks 85 and 87, which are designed to pass signals $f_1$ and $f_2$ respectively. In the example herein described, signal $f_1$ is passed by filter 85 to conductor 89 and applied through conductor 61 to output terminal 91 and as a feedback signal to the input of mixer 63 to maintain the circuit in the above described state.

To reset the flip-flop to the zero state, switch 26 is operated, thereby simultaneously removing the $f_1$ feedback signal and applying signal $f_2$ from signal generator 25 through conductor 61 to mixer circuit 63 wherein it is mixed with signal $f_0$ from oscillator 65 to produce output signals $f_0$, $f_2$, $f_0+f_2$, and $f_0-f_2$ or $f_4$. These signals are applied through conductor 69 to filter networks 71 and 73, the latter of which is tuned to a frequency of $f_4$, and the resultant $f_4$ signal is applied through conductors 74 and 74a to output terminal 77 and to mixer circuit 79, where it is mixed with the $f_0$ signal from oscillator 65. The resultant output signals on conductor 83, $f_0$, $f_4$, $f_0-f_4$ or $f_2$ and $f_0+f_4$ are applied to filter networks 85 and 87, the latter of which is tuned to a frequency of $f_2$. The resultant output signal $f_2$ is then applied through conductor 61 to output terminal 91 and reapplied as a feedback signal through conductor 61 to the input of mixer circuit 63 to maintain the flip-flop in the above described "0" state.

Summarizing the operation of the above described embodiment, when signal $f_1$ is applied as the input signal to the frequency flip-flop, signals $f_3$ and $f_1$ are generated on output terminals 77 and 91; when signal $f_2$ is applied as the input signal, output signals $f_4$ and $f_2$ are generated on output terminals 77 and 91 respectively. The above described arrangement of FIG. 2 utilizes the heterodyne principle of beating two signals and selective filters the resultant beat frequency signal as the output.

Figure 3:
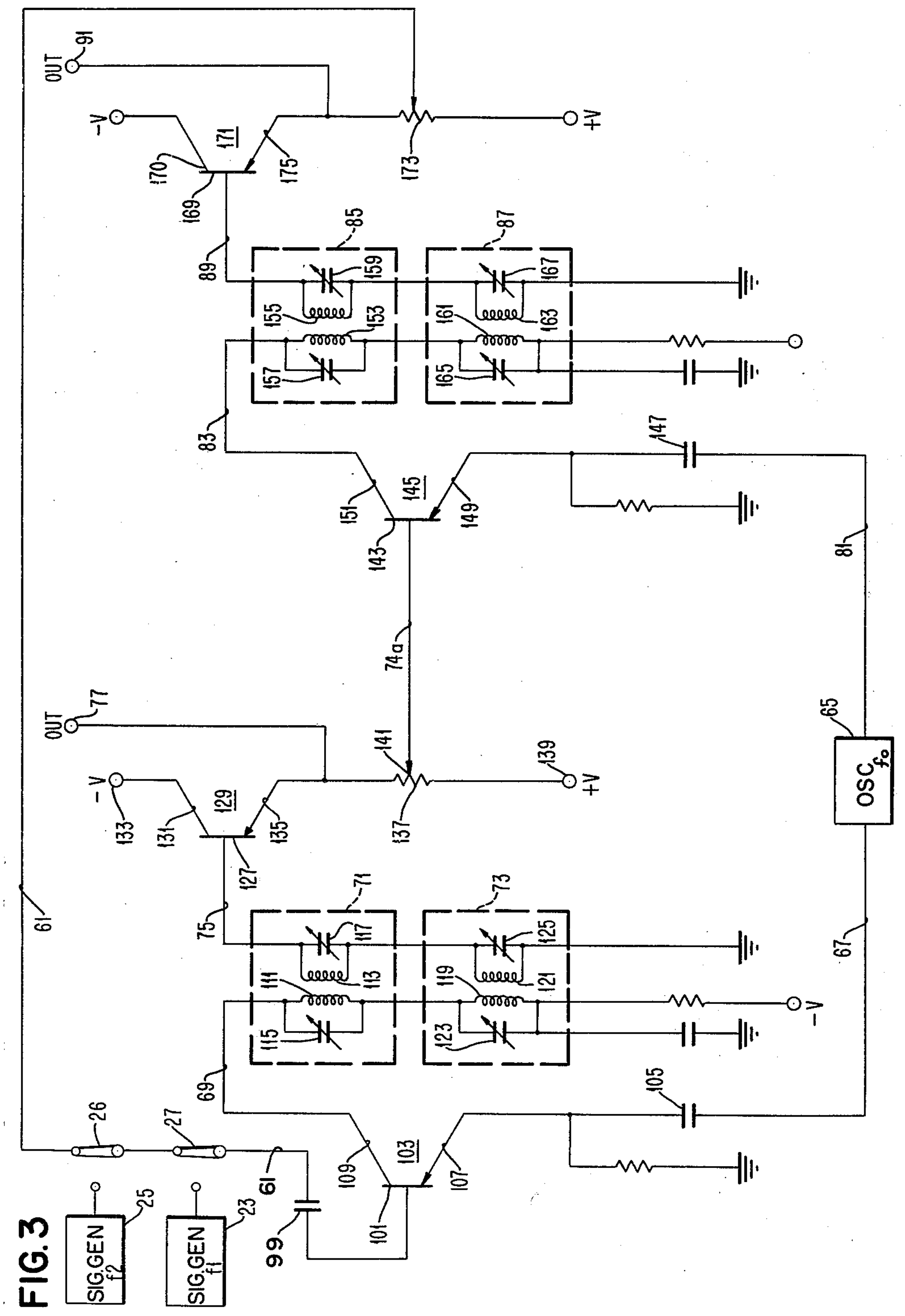
FIG. 3 illustrates in schematic form the subject invention illustrated in block form in FIG. 2.

Referring now to FIG. 3 there is illustrated in schematic form the preferred embodiment of the subject invention shown in block form in FIG. 2. To "set" the flip-flop to the "1" state, the signal $f_1$ is applied through conductor 61 and capacitor 99 to the base 101 of transistor 103, while the signal $f_0$ is applied from oscillator 65, shown in block form, through conductor 67 and capacitor 105 to the emitter 107 of transistor 103. Transistor 103 and associated circuitry comprises the mixing stage shown as block 63 in FIG. 2, wherein signals applied to the base and emitter are mixed to the four frequencies heretofore designated, $f_1$, $f_0$, $f_0+f_1$ and $f_0-f_1$ or $f_3$ on collector 109. The resultant signals are in turn applied through conductor 69 to filter networks 71 and 73. In the preferred embodiment, filter networks 71 and 73 comprise tuned circuits which are tuned to resonant frequencies $f_3$ and $f_4$ respectively. Parallel resonant circuit 71 comprises transformer windings 111 and 113 and associated capacitors 115 and 117, while parallel resonant circuit 73 comprises transformer windings 119 and 121 and associated capacitors 123 and 125 respectively. In the instant example, the resultant output signal from filter circuit 71 is adapted through conductor 75 to the base 127 of transistor 129. Transistor 129 and associated circuitry is a power amplifier circuit which functions as a level setter to raise the level of the output signal of filter circuit 71 to the level required for mixer stage 79. Since the amplifier circuit performs no logical function, it was omitted from the logical diagram of FIG. 2. The collector 131 of transistor 129 is connected to a source of negative potential at terminal 133, while the emitter 135 is connected through potentiometer 137 to a source of positive potential at terminal 139. The signal generated by emitter current flow through potentiometer 137 is applied through variable arm 141 and conductor 74a to base 143 of transistor 145, which functions as mixer circuit 79, while the signal from oscillator 65 is applied through conductor 81 and capacitor 147 to the emitter 149 of transistor 145. The resultant output signals on collector 151, $f_0$, $f_3$, $f_0-f_3$, or $f_1$ and $f_0+f_3$ are applied through conductor 83 to filter circuits 85 and 87. Filter circuit 85, comprising transformer windings 153, 155 and associated capacitors 157, 159 respectively is a resonant circuit tuned to frequency $f_1$; filter network 87 comprising transformer windings 161, 163 and associated capacitors 165, 167 respectively is a resonant circuit tuned to frequency $f_2$. The resultant signal from filter circuit 85 is applied through conductor 89 to base 169 of transistor 171, which functions as a power amplifier providing the same impedance matching and isolation functions as power amplifier 129. The resultant signal from emitter 175 of transistor 171 is applied to output terminal 91, and the signal developed across potentiometer 173, which provides a gain adjustment to compensate for the variation in transformer characteristics, is then coupled through conductor 61 and capacitor 99 to the base 101 of mixer 63 as a feedback signal to provide the required regenerative flip-flop action. The two output terminals 77 and 91 under the above described conditions correspond to those shown in FIG. 2.

To reset the subject device to the "0" state, a signal of frequency $f_2$ is applied from signal generator 25 through switch 26, conductor 61 and capacitor 99 to the base 101 of transistor 103 where it is mixed with the signal $f_0$ from oscillator 65 applied to emitter 107 of transistor 103. One of the frequencies generated by the mixer circuit, $f_4$, is applied through conductor 75 to the base 127 of power amplifier 129. The resultant output signal from the emitter 135 of the power amplifier transistor is applied to output terminal 77, and through potentiometer 137 to the base 143 of transistor 145. The second input to the mixer circuit comprises the $f_0$ signal from oscillator 65 which is applied to the emitter 149 of transistor 145. Filter network 87 is tuned to one of the four output signals generated by mixer 145, $f_4$. The output from filter network 87 is applied through conductor 89 to the base 169 of power amplifier 171. The output from emitter 175 of transistor 171 is in turn applied to output terminal 91 and a portion thereof is applied through potentiometer 173, conductor 61, switches 26 and 27 and capacitor 99 to the base 101 of transistor 103 to provide the required regenerative flip-flop action for the second stable state.

In the above-described embodiment, the amplitude of the output signals is approximately 60 millivolts peak to peak. The amplitude of oscillator 65 is approximately 1.5 volts peak to peak and the output signals on terminal 77 and 91 are approximately 2 volts peak to peak.

Exemplary values of the circuit components and frequencies employed for the above described frequency flip-flop are as follows:

| Signal: | KC |
|---|---|
| $f_1$ | 580 |
| $f_2$ | 680 |
| $f_3$ | 400 |
| $f_4$ | 300 |
| $f_0$ | 980 |

| | |
|---|---|
| Filter 71: | |
| Resonant frequency | 400 kc. |
| Transformer winding | 111–1.54 mh. |
| Transformer winding | 112–1.59 mh. |
| Capacitor | 115–110 μμf. |
| Capacitor | 117–103 μμf. |
| Filter 73: | |
| Resonant frequency | 300 kc. |
| Transformer winding | 119–496 μh. |
| Transformer winding | 121–496 μh. |
| Capacitor | 123–496 μμf. |
| Capacitor | 125–496 μμf. |
| Filter 85: | |
| Resonant frequency | 580 kc. |
| Transformer winding | 153–165 μh. |
| Transformer winding | 155–165 μh. |
| Capacitor | 157–490 μμf. |
| Capacitor | 159–490 μμf. |
| Filter 87: | |
| Resonant frequency | 680 kc. |
| Transformer winding | 161–1.5 mh. |
| Transformer winding | 163–1.5 mh. |
| Capacitor | 165–37 μμf. |
| Capacitor | 167–32 μμf. |

Figure 4:
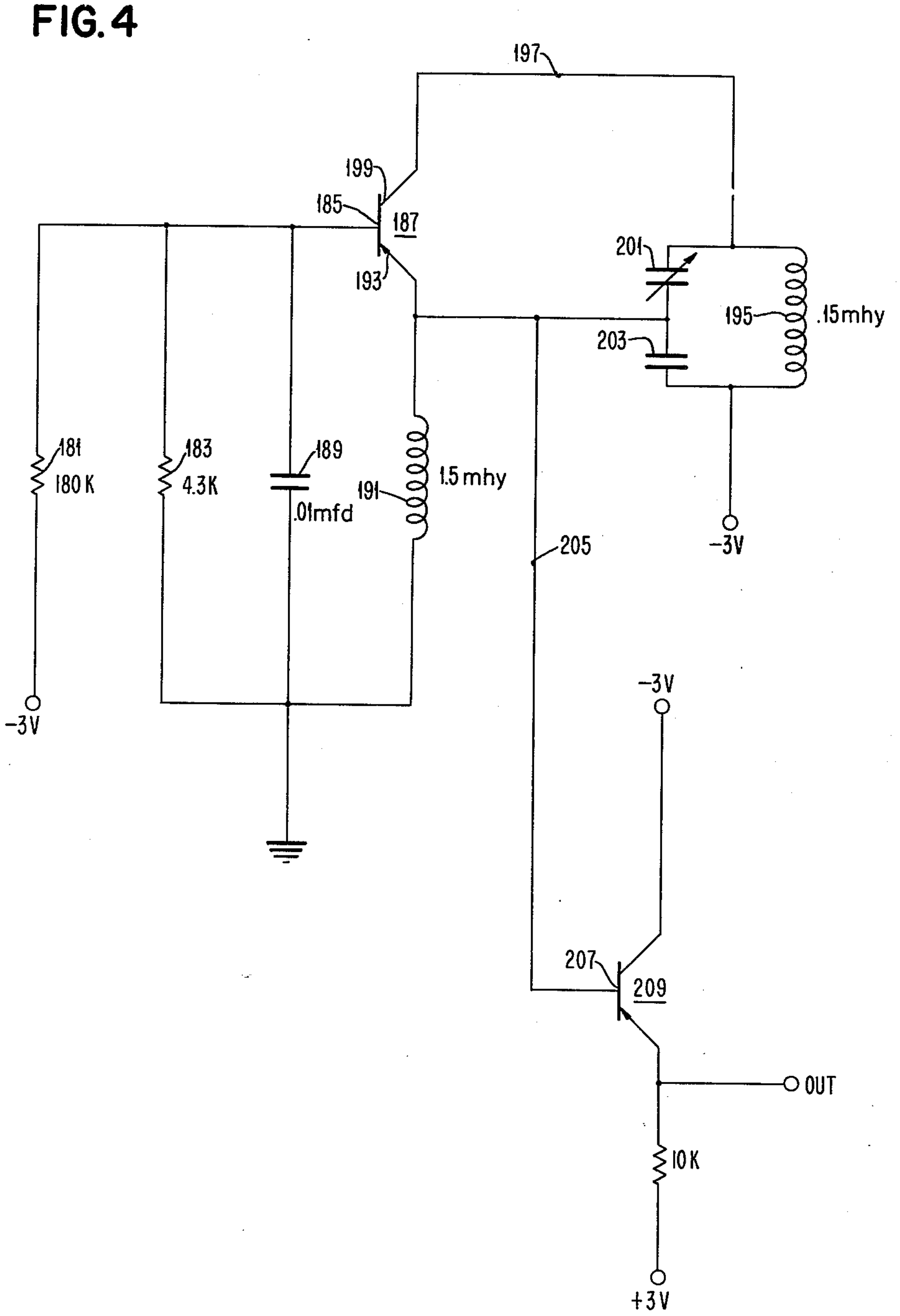
FIG. 4 illustrates in schematic form an oscillator circuit shown as block 65 in FIG. 2.

Referring now to FIG. 4, there is illustrated in schematic form the oscillator circuit shown as block 65 in FIGS. 2 and 3. In the preferred embodiment constructed in accordance with the principles of the present invention, a transistorized Colpitts oscillator is utilized. Resistors 181 and 183 connected to −3 volts and ground respectively provide D.C. bias to the base 185 of transistor 187, while capacitor 189 effectively biases the base at A.C. ground, thereby enabling the circuit to function in a grounded base configuration. Transformer primary winding 191 connected to emitter 193 of transistor 187 and secondary winding 195 connected through conductor 197 to the collector 199 of transistor 187 provides a feedback to the collector to sustain oscillation. Capacitors 201 and 203 together with transformer winding 195 are the frequency determining components of the oscillator.

The output from the oscillator is applied through conductor 205 to base 207 of emitter follower 209, which functions as a buffer amplifier to prevent changes in the load from varying the oscillator frequency and power amplifies the oscillator output signal to the desired operating level.

Figure 5:
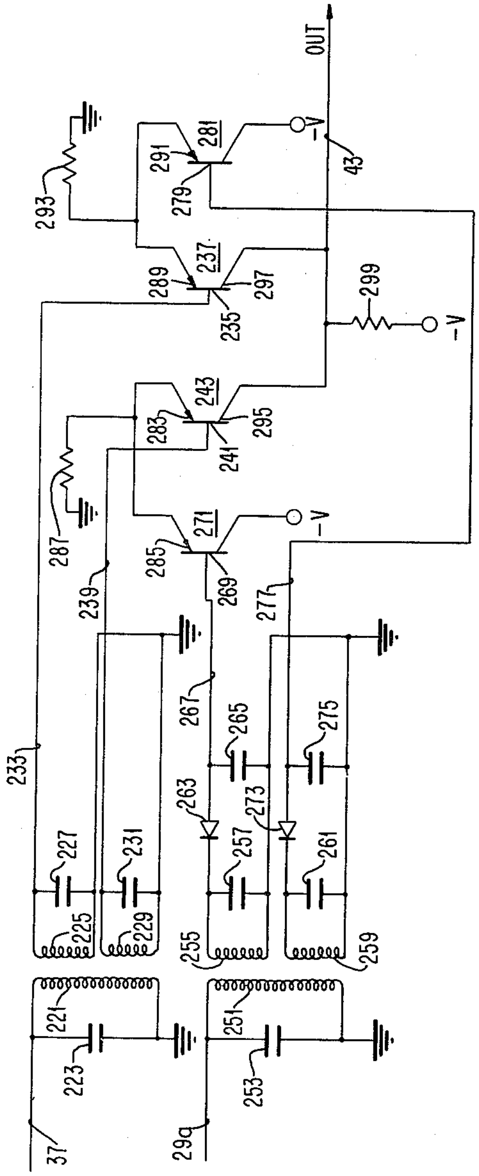
FIG. 5 illustrates in schematic form an inhibit circuit of the type shown as block 39 in FIG. 1.

Referring to FIG. 5, there is illustrated one arrangement of an inhibit circuit of the type shown as blocks 39 and 55 in FIG. 1. Since the inhibit circuits are identical, inhibit circuit 39 will be described as illustrative, and the inputs thereto and outputs therefrom labeled accordingly.

As heretofore described, inhibit circuit 39 has two inputs, one from filter network 35 through conductor 37, the second the input signal through conductor 29*a*. In the FIG. 1 arrangement, signals $f_1$ and $f_2$ are always applied from filter 35 through conductor 37 irrespective of the frequency of the input signal. As shown, the input signal is applied across transformer primary winding 221 and capacitor 223 to ground. The circuit comprising secondary winding 225 and capacitor 227 is tuned to frequency $f_1$, while the circuit comprising secondary winding 229 and capacitor 231 is tuned to frequency $f_2$. Irrespective of the frequency of the input signal, signal $f_1$ will be applied through conductor 233 to base 235 of transistor 237, and signal $f_2$ will be applied through conductor 239 to base 241 of transistor 243. The second input to inhibit circuit 39 will be the input signal, $f_1$ in the assumed example which is applied through conductor 29*a* across transformer primary winding 251 and capacitor 253 to ground. The circuit comprising secondary winding 255 and capacitor 257 is tuned to frequency $f_2$, while the circuit comprising transformer secondary winding 259 and capacitor 261 is tuned to frequency $f_1$. Diode 263 and capacitor 265 rectify signal $f_2$ before it is applied through conductor 267 to base 269 of transistor 271, while diode 273 and capacitor 275 rectify signal $f_1$ before it is applied through conductor 277 to base 279 of transistor 281. Emitters 283 and 285 of transistors 243 and 271 are connected through common resistor 287 to ground, while emitters 289 and 291 of transistors 237 and 281 respectively are connected through common resistor 293 to ground. Collectors 295 and 297 are connected through resistor 299 to a source of negative potential, and to common output conductor 43. Depending on whether $f_1$ or $f_2$ is the input signal, a negative potential will be applied to the base of transistors 281 or 271 to inhibit its associated transistor 237 or 243 respectively. In the instant situation where the input signal is $f_1$, transistor 281 is turned on and thereby inhibits transistor 237. Under this condition, transistor 271 remains off due to the absence of signal $f_2$, and the signal applied to base 241 of transistor 243 is amplified and applied through collector 295 to output conductor 43. On the other hand, if the input signal is $f_2$, transistor 271 is turned on, thereby inhibiting transistor 241, and the $f_1$ signal is amplified by transistor 237 and applied through collector 297 to output conductor 243. Inhibit circuit 55 functions in the same identical manner to inhibit the signal applied to both inputs and pass the other input signal.

While the contemplated environment for the above described invention resides in a frequency logic system, the circuit is not limited thereto, since the output signal could readily be rectified to operate in a conventional logic system. Within a frequency logic system, various logical devices could be employed using different frequencies to identify particular logical conditions and thereby utilize common conductors. Such devices could be separated where desired by appropriate filter networks.

While there has been shown and described and pointed out the fundamental novel features of the invention as applied to a plurality of embodiments, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A bistable switching device having a plurality of outputs wherein the frequency of the output signals indicates the binary state of said device comprising, in combination, a dual frequency signal source, means for selectively applying an input signal from said dual frequency signal source to said device, a signal source of constant frequency, means for heterodyning said input signal with said constant frequency signal, means for filtering one of the resultant heterodyned signals and applying said filtered signal to one of said outputs, means for heterodyning said filtered signal and said constant frequency signal, means for filtering a second one of said resultant heterodyned signals and applying said second filtered signal to said second output, the frequency of said output signals identifying the stable state of said device, the frequency of said second output signal being equal to that of said input signal, and means for maintaining said device in said stable state by reapplying said second output signal to the input of said device.

2. A switching circuit having a plurality of stable states wherein the state of said circuit is controlled by the frequency of the input signal applied to the input of said device comprising, in combination, means for applying an input signal of predetermined frequency to said circuit, a fixed frequency signal source for generating a fixed frequency signal, means responsive to said input signal and said fixed frequency signal for generating a plurality of signals of different frequencies including a signal of frequency corresponding to a function of said input signal, means for detecting said corresponding signal, means responsive to said detected signal for generating a maintaining signal equal in frequency to the frequency of the input signal applied, and means feeding said maintaining signal back to said input for maintaining said switching circuit in the same stable state to which it was switched by said input signal, upon discontinuance of said input signal.

3. A bistable switching circuit having a dual frequency signal source wherein the stable states of said circuit are identified by signals having frequencies corresponding to those of said dual frequency signal source comprising, in combination, means for selectively applying one of said dual frequency signals to the input of said circuit, a constant frequency signal source for generating a constant frequency signal, means for combining said applied signal and said constant frequency signals to provide a first plurality of signals including signal corresponding in frequency to those of said dual frequency source selected, means for detecting one of said plurality of signals, means for combining said detected signal with said constant frequency signal to provide a second plurality of signals including signals corresponding in frequency to said dual frequency signal source selected, means to detect a signal from said second plurality of signals, said last detected signal being equal in frequency to said applied signal from said dual frequency signal source, and means for applying said second detected signal to said input of said switching circuit to maintain said circuit in said stable state.

4. A bistable switching circuit wherein the state of said device is controlled by the frequency of the signals applied to the input of said device comprising in combination means for applying an alternating input signal to the input of said circuit, a constant frequency signal source for generating a constant frequency signal, means responsive to said input signal and said constant frequency signal for generating a first plurality of signals including said input and constant frequency signals and combinations thereof, means for detecting one of said first plurality of signals, said detected signal having a frequency corresponding to a function of said input and fixed constant frequency signals, means responsive to said detected signal and said constant frequency signal for generating a second plurality of signals, means for detecting one of said second plurality of signals, said latter detected signal having a frequency equal to that of said input signal, whereby said detected signals comprise the output signals identifying the stable state of said device, and feedback means to apply said second detected signal to said input to maintain said switching circuit in said stable state.

5. In combination with means for generating a number of different function signals characterized by respective different frequencies, a logical device having input means, means for selectively coupling said function-signal generating means to said input means, said logical device providing a number of different frequency output signals equal to the number of said function signals and related, respectively, to said different function signals; said logical device including means for generating a constant frequency signal and means for selectively heterodyning each said function signal with said constant frequency signal to provide, a unique output signal of distinct frequency characteristics including, at least, a frequency identical to that of the function signal, means for feeding back said unique output signal, to said input means and means for disconnecting said function signal generating means whereby said unique output signal of a distinct frequency is maintained.

References Cited by the Examiner

UNITED STATES PATENTS

| | | | |
|---|---|---|---|
| 2,386,566 | 10/45 | Nyquist | 178—66 |
| 2,406,932 | 9/46 | Tunick | 331—43 |
| 2,652,451 | 9/53 | Feten | 178—88 |
| 2,770,722 | 11/56 | Arams | 250—15 |
| 2,829,255 | 4/58 | Bolie | 331—39 |
| 2,914,249 | 11/59 | Goodall | 235—176 |
| 2,914,671 | 11/59 | DeLange | 250—15 |
| 2,928,008 | 3/60 | Takahasi | 308—88 |
| 2,934,658 | 4/60 | Lewis | 307—88.5 |
| 2,948,818 | 8/60 | Goto | 307—88 |
| 3,011,706 | 12/61 | Goto | 328—92 |

DAVID J. GALVIN, *Primary Examiner.*

EVERETT R. REYNOLDS, IRVING L. SRAGOW, *Examiners.*